(12) United States Patent
Faber et al.

(10) Patent No.: US 6,413,898 B1
(45) Date of Patent: Jul. 2, 2002

(54) ZEOLITE/ALUMINA CATALYST SUPPORT COMPOSITIONS AND METHOD OF MAKING THE SAME

(75) Inventors: Margaret K. Faber, Corning; Shy-Hsien Wu, Horseheads; Yuming Xie, Painted Post; Kenneth E. Zaun, Corning, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/735,207

(22) Filed: Dec. 12, 2000

Related U.S. Application Data

(60) Provisional application No. 60/173,365, filed on Dec. 28, 1999.

(51) Int. Cl.[7] .................... B01J 29/06; B01J 21/00; B01J 29/04; B01J 21/04
(52) U.S. Cl. .................... 502/64; 502/63; 502/65; 502/73; 502/87; 502/439; 502/527.19
(58) Field of Search .................... 502/439, 63, 64, 502/65, 66, 71, 73, 74, 87, 407, 414, 415, 527.18, 527.19; 501/153, 154

(56) References Cited

U.S. PATENT DOCUMENTS

| | | | |
|---|---|---|---|
| 4,309,277 A | * | 1/1982 | O'Hara et al. ............ 208/111 |
| 4,631,267 A | | 12/1986 | Lachman et al. |
| 4,631,268 A | | 12/1986 | Lachman et al. |
| 4,631,269 A | | 12/1986 | Lachman et al. |
| 4,637,995 A | | 1/1987 | DeAngelis et al. |
| 4,657,880 A | | 4/1987 | Lachman et al. |
| 4,788,169 A | | 11/1988 | Degman, Jr. et al. |
| 4,814,315 A | * | 3/1989 | Kukes et al. ............ 502/200 |
| 4,888,317 A | | 12/1989 | DeAngelis et al. |
| 5,001,097 A | | 3/1991 | Pecoraro |
| 5,179,053 A | | 1/1993 | Subramanian et al. |
| 5,185,305 A | | 2/1993 | Subramanian et al. |
| 5,244,852 A | | 9/1993 | Lachman et al. |
| 5,292,991 A | | 3/1994 | Lachman et al. |
| 5,316,991 A | | 5/1994 | Subramanian et al. |
| 5,316,996 A | | 5/1994 | Itoh |
| RE34,804 E | | 12/1994 | Lachman et al. |
| RE34,853 E | | 2/1995 | DeAngelis et al. |
| 5,417,947 A | | 5/1995 | Hertle et al. |
| 5,492,883 A | | 2/1996 | Wu |
| 5,500,199 A | | 3/1996 | Bellussi et al. |
| 5,565,394 A | | 10/1996 | Lachman et al. |
| 5,589,147 A | | 12/1996 | Farnos et al. |
| 5,607,892 A | | 3/1997 | Chopin et al. |
| 5,614,079 A | * | 3/1997 | Farnos et al. ............ 208/27 |
| 5,626,826 A | | 5/1997 | Chopin et al. |
| 5,633,217 A | | 5/1997 | Lynn |
| 5,916,433 A | * | 6/1999 | Tejada et al. ............ 208/254 H |
| 5,948,942 A | * | 9/1999 | Ramirez De Agudelo et al. ............ 564/490 |
| 6,048,816 A | * | 4/2000 | Brown et al. ............ 502/77 |

FOREIGN PATENT DOCUMENTS

| | | | |
|---|---|---|---|
| EP | 0 197 645 A1 | * | 10/1986 |
| EP | 0899002 | | 3/1999 |
| JP | 5184934 | | 7/1993 |
| JP | 7053208 | | 2/1995 |
| JP | 07204504 | | 8/1995 |

* cited by examiner

Primary Examiner—Steven P. Griffin
Assistant Examiner—Cam N. Nguyen
(74) Attorney, Agent, or Firm—Timothy M. Schaeberle; Kees van der Sterre

(57) ABSTRACT

Zeolite/alumina composite, and a method for making, the composite for use as a catalyst substrate or catalyst carrier and comprising zeolite having a silica/alumina ratio of greater than 300 and gamma alumina having a specific surface area of greater than 100 m²/g. The zeolite/alumina composite exhibits a modulus of rupture of at least 750 psi. Additionally, the invention is also directed at a three catalyst (TWC) system for use in the removal of hydrocarbons, carbon monoxide and oxides of nitrogen from waste gas, the TWC system comprising the following components: (1) a zeolite/alumina composite catalyst support exhibiting a modulus of rupture of at least 750 psi and having a zeolite with a silica/zeolite ratio of at least 300 and the alumina comprising a gamma alumina having a specific surface area of greater than 100 m²/g; and, (2) a noble metal catalyst impregnated on the catalyst support, the noble metal selected from the group consisting of platinum, rhodium, iridium and palladium.

9 Claims, No Drawings

ZEOLITE/ALUMINA CATALYST SUPPORT COMPOSITIONS AND METHOD OF MAKING THE SAME

This application claims the benefit of U.S. Provisional Application No. 60/173,365, filed Dec. 28, 1999, entitled "Zeolite/Alumina Catalyst Support Compositions and Method of Making the Same", by Faber et al.

BACKGROUND OF THE INVENTION

1. Field of the Invention

The present invention relates to a zeolite/alumina composite material exhibiting a high strength and a high surface area, specifically a surface area high enough to be suitable for catalyst impregnation.

This invention also relates to a process for the preparation of such composition, and to the use thereof, notably in the field of catalysis, whether as a catalyst and/or catalyst support for the conversion of vehicular exhaust gas.

2. Background and Discussion of the Related Art

The Clean Air Act of 1970 requires that a catalytic converter be installed on an automobile to purify the exhaust gas stream. The catalytic converter removes unburned gasoline, carbon monoxide and nitrogen oxides simultaneously in the exhaust stream. A conventional catalytic converter consists of a multi-channel ceramic honeycomb and includes a high surface area material that is, along with the actual catalytic material (e.g., three-way catalyst (TWC)), washcoated onto the ceramic material. The monolithic ceramic honeycomb provides a strong substrate for the catalyst, in addition to meeting mechanical and thermal requirements. However, acting as an inert structure, the catalyst substrate does not participate in the chemical reactions for removal of unburned hydrocarbons, carbon monoxide and nitrogen oxides.

U.S. Pat. No. Re. 34,804 discloses the formation of extruded zeolite honeycomb bodies that include a permanent binder silicone resin component. An improved method for making the zeolite body is disclosed in U.S. Pat. No 5,492,883 (Wu) wherein the zeolite material is mixed with an aqueous silicone resin emulsion and, a temporary binder, such as methylcellulose, and the mixture is extruded to form a green honeycomb body, which is thereafter dried and sintered. Another improved method for making a zeolite body is disclosed in U.S. Pat. No. 5,633,217 (Lynn), wherein it discloses the use of a dibasic ester as the solvent for the silicone resin and the use of a methylcellulose temporary binder. Finally, U.S. Pat. No. 5,565,394 (Lachman et al.) discloses improved zeolite bodies that include a thermal expansion control component such as calcium silicate, permanent binder such as silica or alumina and a temporary binder such as methylcellulose. Although the zeolites disclosed in the Wu, Lynn and Lachman references are not inert and are capable of use as a catalyst material, they each require the application of a precious metal washcoat in order to function as a three-way catalyst capable of the conversion of hydrocarbons, nitrogen oxides and carbon monoxide into their nontoxic gaseous counterparts.

It is well known in the catalyst art that catalytic converters having smaller cell dimensions and cell wall thickness' exhibit increased catalyst geometric surface area resulting in increased diffusion of the pollutants into and in contact with the catalyst; i.e. an increased flux without significant increase in back pressure. Secondarily, honeycombs with high cell density have small cell dimensions, which increase the concentration gradients for pollutants to diffuse to the catalyst surface. This results in a high flux of pollutant gas flow to the surface of catalyst.

From the catalyst point of view, a minimum amount of catalyst is required in order to convert pollutant gases to environmentally benign gases. It follows then that ideally a high cell density honeycomb with a thin wall and a thin catalyst washcoating would be preferred in terms of pollutant gas diffusion; i.e., high or increased geometric surface. However, it is undesirable to washcoat a catalyst-containing slurry onto high cell density ceramic honeycombs utilizing a conventional washcoating process since the channel size of the honeycomb is reduced. In addition, the application of a relatively thick washcoat layer on thin wall, high cell density substrates, significantly increases the wall thickness. Increased washcoat thickness/wall thickness, in turn can increase the backpressure undesirably. Thus, catalytic converters comprising high cell density ceramic honeycombs that include washcoat are not the best means for increasing the conversion efficiency of the catalytic converter.

There is, accordingly, a clear need for, and thus an object of the present invention is to provide, a catalyst support material capable of being extruded into a catalyst support body exhibiting a high cell density, a thin wall thickness and sufficient strength for catalytic applications, and exhibiting a sufficiently high geometric surface area for precious metal catalyst impregnation without requiring a catalyst/high surface area material washcoating component.

SUMMARY OF THE INVENTION

The object of the present invention is to solve the above problems of the prior art and to provide a method for making a high surface area catalyst support capable of being extruded into a high cell density, thin wall thickness body and thereafter impregnated with precious metal catalyst material.

Specifically, the invention is directed at a zeolite/alumina composite for use as a catalyst substrate or catalyst carrier comprising a zeolite having a silica/alumina ratio of greater than 300 and a gamma alumina having a specific surface area of greater than 100 $m^2/g$. The zeolite/alumina composite exhibits a modulus of rupture of at least 750 psi.

This invention also relates to a method for producing an extruded honeycomb monolith having a high surface area, comprising mixing into a substantially homogeneous body the following components:

(i) a zeolite having a silica/alumina ratio of at least 300 to 1 and a surface area of at least 250 $m^2/g$;

(ii) a gamma alumina component having a specific surface area of greater than 100 $m^2/g$, at least a portion of which is boehmite functioning as the permanent binder;

(iii) a temporary binder selected from the group consisting of methylcellulose, ethylcellulose, hydroxybutylcellulose, hydroxybutylmethylcellulose, hydroxyethylcellulose, hydroxymethylcellulose, hydroxypropylcellulose, hydroxypropylmethylcellulose, hydroxyethylmethylcellulose, and mixtures thereof; and, (iv) water; Following mixing of the raw materials, the method involves extruding the mixture to form a green honeycomb structure, and then heating the structure for a time in the range of 5 to 30 minutes to form a crack-free dry structure. Once the extruded body is dried, the method next involves heating the dried honeycomb structure to a temperature range of 500 to 1000° C. for a time period sufficient to form a sintered structure having a high surface area and high mechanical strength.

The invention is also directed at a three-way catalyst (TWC) system for use in the removal of hydrocarbons, carbon monoxide and oxides of nitrogen from waste gas, the TWC system comprising the following components:

(1) a zeolite/alumina composite catalyst support exhibiting a modulus of rupture of at least 750 psi and having a zeolite having a silica/zeolite ratio of at least 300 and the alumina comprising a gamma alumina having a specific surface area of greater than 100 m$^2$/g; and, (2) a noble metal catalyst impregnated on the catalyst support, the noble metal selected from the group consisting of platinum, rhodium, iridium and palladium.

DETAILED DESCRIPTION OF THE INVENTION

The product of the present invention is a zeolite/alumina composite for use as a catalyst substrate or catalyst carrier, specifically a composite wherein the zeolite exhibits a silica/alumina ratio of greater than 300 and a gamma alumina having a specific surface area of greater than 100 m$^2$/g. The inventive composite exhibits a modulus of rupture of at least 750 psi, preferably at least 1000 psi. Expressed in parts by weight, the zeolite alumina composites, according to the invention, characteristically contain between about 30 to 70 parts by weight zeolite and between about 30 to 70 parts by weight gamma alumina.

Typically, zeolites comprise large particles on the order of several microns and exhibit a regular array of accessible micropores, a combination that provides the high surface attribute of zeolites; a feature that is retained by zeolites after sintering. The gamma alumina component having the high surface area of at least 100 m$^2$/g also contributes to result in an overall composite body that is well within the surface area requirements of many catalyst support applications. Generally, such applications require substantial overall surface areas of at least 20 m$^2$/g, preferably greater than 100 m$^2$/g, and most preferably greater than 150–200 m$^2$/g. The inventive zeolite/gamma alumina composite is capable of being extruded into a high cell density, thin walled monolithic body, e.g., a honeycomb structure exhibiting at least 600 cells/in$^2$, exhibiting surface areas of at least 100 m$^2$/g, with surface areas in excess of 200 m$^2$/g being readily attainable.

It is well known in the art that the presence of the amorphous form of silica, that form of silica present when supplied as the permanent binder, provides a mobile support for precious group metals (PGM) such as platinum. At high temperatures the mobile silica allow the PGM to disperse, or "sink", into the silica; i.e., PGM incompatibility. Ultimately this phenomenon leads to an undesirable reduction in the catalytic performance of the PGM, therefore a silica binder-free composite is required for high temperature catalytic applications. However, a permanent binder is still necessary in the instant composite to provide adequate strength. A portion of the gamma alumina component provides this binder function. Specifically, gamma alumina provided as a gamma alumina precursor in the form of boehmite is converted to gamma alumina upon firing, while still functioning as the permanent binder in the inventive composite. The substitution of boehmite for silica as the permanent binder results in the formation of a composite body that is compatible with precious metals catalytic materials. This compatibility, coupled with the aforementioned high surface area, makes this composite particularly suitable for use as catalyst support material into which precious metal catalytic materials can be incorporated without the use of an undesirable washcoat that would add thickness to the walls of the support and reduce the flux or catalytic activity of the catalytic converter.

Other features of this composite body that make it suitable for use as a catalyst support include its relatively low thermal expansion and high thermal stability; less than 5×10$^{-6}$/°C. and a thermal stability up to at least 1000° C., respectively.

The general method of producing porous sintered substrates, as one skilled in the art can appreciate, is by mixing batch materials, blending the mixture, forming a green body, and subsequently sintering the green body to a hard porous structure. In the manner of making the body various lubricants, such as zinc stearate and sodium stearate, and organic binders are added to the batch during the mixing step to provide viscosity control and strength prior to firing and porosity to the after fired structure.

A particularly preferred method for producing the composite of the invention described herein, an extruded honeycomb monolith having a high surface area, comprises mixing into a substantially homogeneous body certain raw materials capable of forming the aforementioned composite. Specifically, the raw materials that will form a composite wherein the zeolite component exhibits a silica/alumina ratio of at least 300 to 1 and a surface area of at least 250 m$^2$/g silica and the gamma alumina component exhibits a specific surface area of greater than 100 m$^2$/g. At least a portion of the alumina raw material should comprise boehmite which will function as the permanent binder thereby providing the requisite strength to the composite. As is standard in the formation of ceramic structures, the batch mixture should include a temporary organic binder and water. The preferred method of forming the body includes extruding the body to form a green honeycomb structure. Once formed into a honeycomb body the extruded green body is then dried by heating the structure for a time period in the range of 5 to 30 minutes to form a crack-free dry structure. Sintering of the dried honeycomb structure involves heating or sintering to a temperature range of 500 to 1000° C. for a time period sufficient to form a sintered structure having a high surface area.

Prior to sintering the structure, the drying step is accomplished by placing the structure in an oven at a temperature in the range of 50 to 100° C., preferably, at a temperature in the range of 90 to 100° C. In a particularly preferred embodiment, the drying step is accomplished by placing the green structure in a dielectric oven for a period of time sufficient to form a crack-free, self-supporting structure. Preferably, the green body is dried in a dielectric oven for a period of no greater than 60 minutes, more preferably for a period of 5 to 30 minutes.

Porosity of the zeolite/alumina composite should be sufficient to permit access to the catalyst through the walls, total porosity and pore size should be maintained within a certain range. The range of choice may be varied to accommodate the proposed effluent. Porosity is dependent upon the raw materials and the firing temperature, the higher the temperature the more dense the resulting structure. For catalyst and/or catalyst support applications, the inventive zeolite/alumina structures may exhibit a total porosity of about at least about 30%, with pores having diameters ranging about at least 20 nm, preferably about at least 20–200 nm.

The zeolite component of the composite is desirably a high silica-containing zeolite exhibiting a SiO$_2$/Al$_2$O$_3$ molar ratio of greater than 300. The presence of a zeolite having the requisite high silica/alumina ratio provides the composite the ability to adsorb hydrocarbons at low temperatures and desorb them at high temperatures. More specifically, the high silica zeolite ensures that zeolite component exhibits thermal stability at those high temperatures typically experienced in the exhaust environment. In other words, the high silica content of the zeolite provides the composite with the ability to maintain its structure at high temperatures. On the other hand, the presence of a low alumina content in the zeolite ensures that the zeolite will not experience the type of moisture problems typically associated with zeolites having high alumina content; high alumina zeolites typically de-aluminate in the presence of moisture at high temperatures. Furthermore, the zeolites crystalline silica phase is maintained at high temperatures and is responsible for the negative CTE characteristic that compensates to reduce the overall thermal expansion of the composite body. As a result, high thermal expansion catalytic materials may be added to the zeolite/alumina catalytic support, the result being a catalytic body having the suitable thermal expansion necessary for high temperature automotive exhaust gas environments.

Suitable zeolites include any silica-based zeolite having the requisite very high silica/alumina ratio. Useful high silica/alumina ratio-containing zeolites for the practice of the invention can be found among the zeolites selected from the following: mordenite, ultrastabilized Y (USY), ZSM-5, ZSM-8, ZSM-11, ZSM-12, Hyper Y, beta-zeolites, H-ferrierite, H-offretite, HL powder, faujasite, X zeolite, type L zeolite, mazzite, EMC-2, and combinations of these, preferably silicalite, and any of the natural zeolites including erionite, clinoptilolite, chanazite and phillipsite. One commercially available zeolite having the requisite high silica property is CBV 3002 available from the PQ Corporation.

The presence of alumina provides the zeolite-based composite structure the support material function. Specifically the gamma alumina provides the necessary sites to enable binding of precious metal catalyst to the structure, such that the composite will have enhanced catalytic activity and lifetimes over zeolite-only structures, when used in the harsh environments typically associated with exhaust gas. Additionally, the alumina, whereby the noble metals are typically sited is porous enough and exhibits a high enough surface area porous structure so as to inhibit sintering of the noble metals present and to provide for the accessibility of the noble metals to the exhaust stream. Specifically, the high surface area gamma alumina ensures that the surface area of the composite will be significantly increased and be in the aforementioned range of 100 to, greater than, 200 $m^2/gm$. Lastly, as described above, at least a portion of the alumina raw material is provided in the form of the gamma alumina precursor, boehmite, which functions as the permanent binder thereby providing the requisite strength to the composite. The presence of the boehmite assures that the flexural strength, i.e., modulus of rupture, of the silica binder-free composite is at least 750 psi, more preferably greater than 1100 psi, thereby making it suitable for catalytic support applications.

Gamma alumina suitable for use in the formation of this composite include those aluminas that after calcining provide the requisite gamma alumina phase and exhibit a sufficiently high surface area suitable for functioning as the catalytic support material. A suitable commercially available gamma alumina having the requisite high surface area characteristic is GL-25 supplied by LaRoche Industries.

The gamma alumina precursor, boehmite, not only functions as the permanent binder, it has the additional characteristic of providing the requisite gamma alumina, following firing, exhibiting the requisite surface area necessary to function as the catalytic support material in combination with the non-boehmite gamma alumina. Suitable commercially available boehmite materials include Catapal B supplied by the Vista Chemical Co. and Versal 700 supplied by LaRoche Industries.

The purpose of the organic binder is to provide plasticity during forming, and some green strength after drying. Organic binders according to the present invention refers to cellulose ether type binders and/or their derivatives, some of which are thermally gellable. Some typical organic binders according to the present invention are methylcellulose, hydroxybutylcellulose, hydrobutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof. Methylcellulose and/or methylcellulose derivatives are typically used in the practice of the present invention. Methylcellulose, hydroxypropyl methylcellulose, and combinations thereof are especially preferred. Preferred sources of cellulose ethers and/or derivatives thereof, are Methocel A4M, F4M, and F240M from Dow Chemical Co. Methocel A4M is a methylcellulose binder having a gel temperature of 50–55° C. and gel strength of 5000 $g/cm^2$ (based on 2% solution at 65° C.). Methocel F4M and F240M are hydroxypropyl methylcellulose.

In a preferred embodiment the composite includes a third component, zirconium oxide, for providing additional oxygen storage functionality to the catalyst support. Expressed in parts by weight, the zeolite alumina composites according to the invention characteristically may contain between about 20 to 30%, by weight zirconium oxide. The zirconium oxide further includes a stabilizing agent. Exemplary stabilizing agents that can be used alone or in admixture according to the present invention include the elements selected from among; the rare earth metals, in particular cerium, yttrium, lanthanum, praseodymium, and neodymium; the alkaline-earth metals, in particular calcium, magnesium, barium and titanium. Among these stabilizing agents cerium and yttrium are particularly preferred. Cerium oxide can be present in amounts up to 80% while Yttrium oxide, when present, may range up to 20%; both in weight percent based on the total zirconium amount.

In another embodiment, the composite catalyst support should include both a stabilized zirconia, and a stabilized high surface area alumina. The presence of both components helps to maintain the catalytic activity of the catalyst under the automotive exhaust environment. Stabilized zirconia exhibits an increase oxygen storage capacity. The stabilized alumina should include an amount of stabilizing agent selected from the group consisting of lanthanum oxide ($La_2O_3$) or it equivalents, including barium oxide, strontium oxide and yttrium oxide. These stabilizing agents are known for stabilizing the specific surfaces of the alumina, which in its pure form is typically unstable at high temperatures. Specifically, the stabilizing agents inhibit the phase transformation of alumina at high temperatures, thereby increasing the high temperature stability of the alumina. The stabilizing agents are typically included in the alumina as a pre-dopant prior to the batching of the composite, and more preferably they are added to the composite after firing via an impregnation process.

A preferred stabilizing agent for the alumina is lanthanum oxide ($La_2O_3$), which is included by impregnation into the gamma alumina component of the composite. Lanthanum impregnation is such that the composite includes lanthanum oxide in the weight range of 0.5–20%, preferably 4–6%, with respect to the overall alumina amount. If lanthanum is added in an amount less than such range, then the beneficial effect of increase in activity due to the lanthanum addition is not observed.

In another embodiment of the invention the catalyst support has incorporated within its structure a precious metal catalyst thereby resulting in a three catalyst (TWC) system for use in the removal of hydrocarbons, carbon monoxide and oxides of nitrogen from the waste gas. Specifically, this TWC system catalyst comprises the aforementioned zeolite/alumina composite catalyst support wherein the zeolite exhibits a silica/zeolite ratio of at least 300 and the alumina comprises a gamma alumina having a specific surface area of greater than 100 $m^2/g$.

In a first embodiment the noble metal catalyst is impregnated on the catalyst support with the noble metal selected from the group consisting of platinum, rhodium, iridium and palladium. In a second embodiment the noble metal catalyst is added in powdered form to the initial batch, and the entire batch mixture, including the powder noble metal catalyst is extruded to form the TWC. The result is a TWC wherein the noble metal catalyst is an integral part of the alumina catalyst support component.

The aforementioned TWC catalyst is especially useful in very high cell density (600–2000 cpsi) catalytic converters in order to meet the stringent automotive ULEV emission standards. Specifically, the TWC catalyst, with a high cell density and a thin wall thickness, provides extremely high geometric catalyst surface, which allows a significantly fast diffusion of the exhaust pollutants. Furthermore, this extruded catalyst lowers backpressure of exhaust stream. This catalyst support material, with the impregnated precious metal catalyst, provides much more catalyst supporting materials on which the active components (i.e., the precious metal) are distributed, therefore, the catalyst is less likely to be sintered at the high temperature of the exhaust system. The thin wall TWC catalysts have a much lower heat capacity that allows the catalyst to reach light-off temperatures quickly, thus reducing the cold start emissions.

In a preferred embodiment the inventive TWC catalyst system comprises between 5–60 $g/ft^3$ of noble metal catalyst, more preferably a mixture of platinum and rhodium wherein the platinum/rhodium ratio is about 5. One advantageous mixture comprises platinum in an amount of up to 40 $g/ft^3$ and the rhodium present in an amount up to 8 $g/ft^3$, more preferably 33.3 $g/ft^3$ of platinum 6.6 $g/ft^3$ of Rh.

Since platinum and rhodium need to be impregnated on different supporting materials as discussed above, the impregnation process preferably consists of two steps. The first steps involves impregnating platinum on the alumina, and zirconia if present. In an acidic solution, e.g. hexachloroplatinic acid, the platinum species exist as negatively charged complexes while the surfaces of zirconia and alumina are positively charged. After drying and calcination, the second step involves impregnating the extruded platinum catalyst with a rhodium complex solution, having a negative charge, at a pH of about 7. Under such a condition, rhodium is predominately impregnated on the surface of alumina, however, it does not form an alloy with the platinum metal, already impregnated on the alumina surface, thereby resulting in a segregated catalyst, which is preferable. The catalyst loading of the structure may be higher after it has been fired if the resultant structure is more porous, thereby increasing the surface area.

EXAMPLES

To further illustrate the principles of the present invention, there will be described certain examples of zeolite/alumina bodies formed according to the invention, as well as a comparative zeolite/silica and pure alumina bodies. However, it is to be understood that the examples are given for illustrative purpose only, and the invention is not limited thereto, but various modifications and changes may be made in the invention, without departing from the spirit of the invention.

Example 1

A batch mixture containing 450 grams ZSM-5 zeolite having an $SiO_2/Al2O_3$ of 300 (CBV-3002 from PQ Corporation), 270 grams gamma alumina, (TA 2300 from Sumitomo Chemical, doped with 4 wt % lanthanum and having a surface area of 110 $m^2/g$), 180 grams boehmite (Catapal B from Vista Chemical Co., surface area of 250 $m^2/g$) and 54 grams of a methylcellulose temporary binder (Methocel A4M from the Dow Chemical Co.) was mixed in a Littleford dry blender after treatment with 2%, by weight acetic acid (Aldrich Chemical Company Inc.). The mixed batch then was transferred to a muller and 350 millimeters of water was added to the batch to uniformly plasticize the batch.

Honeycomb bodies with a wall thickness of about 7 mil and exhibiting 400 cells/$in^2$ and canes exhibiting a length of 6 in. were formed by extrusion through a ram extruder. The green extruded honeycombs and the canes were dried at 95° C. in a humidity oven (90% relative humidity) for a period of 24 hours. After drying, the extruded honeycombs and canes were fired in air at a temperature of 850° C. for a period of 4 hours. The composition of the fired body is reported in Table I.

The resultant canes were used for characterization of mechanical properties such as MOR, CTE, and E-modulus. The thermal shock resistance was calculated according to the following formulas: TSR=MOR/(E-mod X CTE). The porosity and mean pore size data was measured for the honeycombs and was generated utilizing a conventional mercury intrusion porosimetry technique. All of these physical properties for the canes and honeycomb are detailed listed in TABLE I.

The resultant honeycombs were impregnated with chloroplatinic acid to yield a nominal 33.3 $g/ft^3$ of platinum and thereafter fired at 550° C. for 3 hours. The platinum loaded honeycombs were then impregnated with rhodium nitrated solution to yield 6.6 $g/ft^3$ of Rh and thereafter fired at 550° C. for 3 hours. The final catalyzed honeycomb had a resultant total catalyst loading of about 40 $g/ft^3$ and a Pt/Rh ratio of about 5.

The catalyzed honeycombs were next tested for automotive catalytic activity in a quartz tube rector located within a split-tube furnace with a simulated exhaust gas mixture. The gas mixture consisted of 0.77% $O_2$, 14% $CO_2$, 0.33% $H_2$, 0.0333% $C_3H_6$, 0.0167% $C_3H_8$, 1% CO, 0.1% NO, 0.0023% $SO_2$, 10% $H_2O$ with the balance being nitrogen. The space velocity of the catalytic reaction was 50,000 $hr^{-1}$. The temperature of the reactor was raised 1° C./min up to the final temperature of 600° C. and the oxygen concentration remained constant so as to maintain the redox ratio of the gas stream at 1.095 throughout the tests. The catalytic activities of the catalyst impregnated honeycomb was measured, specifically the temperature at which 50% conversion was attained for each of the CO and $NO_x$ and hydrocarbons was measured; i.e., the lightoff temperature for the catalyst for each of the noxious gases. The catalytic activity results are reported in TABLE II.

Example 2

A batch of materials containing 360 grams zeolite, 360 grams γ-alumina, 180 grams boehmite and 54 grams methylcellulose temporary binder was mixed and extruded to form both honeycombs and canes; the procedures and specific materials used were the same as those utilized in Example 1. The physical and mechanical properties of the extruded zeolite/alumina composite are shown in TABLE II.

Honeycomb substrates were again catalytically loaded with platinum and rhodium similarly to the method in Example 1. The loaded samples were tested for catalytic activity by utilizing the same mixture, temperature and redox ratio as in Example 1, with the results also shown in TABLE II.

Example 3

A batch of 2270 grams zeolite, 450 grams gamma alumina, 180 grams boehmite (Versal 700 from LaRoche Industries), 54 grams methylcellulose temporary binder and 2%, by weight, acetic acid was mixed together and extruded to form both honeycombs and canes; the procedures and specific materials used, except for the boehmite, were the same as those utilized in Example 1. Physical and mechanical properties are again shown in TABLE I. The extruded honeycombs were catalyzed as described in Example 1 and similarly tested for their catalytic activity; specifically, measurement of the CO, NOx, and HC half conversion temperatures (or lightoff temperatures) The catalytic results reported in TABLE II.

Example 4
Comparison

A batch mixture was prepared in the following manner: 720 grams of a ZSM-5 zeolite (CBV-3002 from PQ Corporation) was mixed with 523.2 grams of a concentrated silicone resin (6-2230 resin from Dow Corning dissolved in a dibasic ester solution in a 3/1 resin/solvent ratio resulting in 20% silica permanent binder). The well-mixed batch was transferred to a muller for the addition of 260 grams of water. The plasticized batch was thereafter extruded through a ram extruder to form honeycomb and cane bodies that were again tested for mechanical and physical properties. The extruded honeycombs were catalyzed, tested for conversion performance in simulated exhaust stream, in a manner like that described above for Example 1.

Example 5
Comparison

A batch mixture containing 720 grams gamma alumina (GH-22 from LaRoche Industries) and 180 grams boehmite (Versal 700 from LaRoche Industries) was mulled by adding 4%, by weight, acetic acid and 390 grams water resulting in a plasticized batch. As previously described, the plasticized batch was extruded into honeycomb and cane bodies for measurement of mechanical and physical properties. The catalyzed honeycombs, catalyzed in a manner as described above for Example 1, were then tested for catalytic performance according to the procedures described in Example 1.

Examples 6–11

These examples, the compositions of which are detailed in TABLE I, were formed into a plasticized batch and fabricated into honeycomb bodies in the manner described above. One notable exception being Example 11, which included in the composition a boehmite component comprising a mixture of two different boehmite raw materials: the boehmite mixture comprised a 50/50 mix of the aforementioned Catapal B and Versal 700 boehmite materials.

As previously described, the catalyzed honeycombs, catalyzed in a manner as described above for Example 1, were then tested for catalytic performance according to the procedures described in Example 1; the catalytic half conversion temperatures, for each example, for CO, NOx and HC being reported in TABLE II.

TABLE I

|  | 1 | 2 | 3 | 4* | 5* | 6 | 7 | 8 | 9 | 10 | 11 |
|---|---|---|---|---|---|---|---|---|---|---|---|
| Batch Mixture (Grams) | | | | | | | | | | | |
| Zeolite | 450 | 360 | 270 | 720 |  | 270 | 450 | 270 | 180 | 360 | 360 |
| Gamma Alumina | 270 | 360 | 450 |  | 720 | 450 | 270 | 450 | 450 | 270 | 270 |
| Boehmite | 180 | 180 | 180 |  | 180 | 180 | 180 | 180 | 270 | 270 | 270 |
| Silicone Resin |  |  |  | 523.2 |  |  |  |  |  |  |  |
| Temporary Binder | 54 | 54 | 54 |  | 54 | 54 | 54 | 54 | 54 | 54 | 54 |
| Water | 350 | 365 | 385 | 260 | 390 | 380 | 355 | 360 | 385 | 370 | 370 |
| Fired Composition | | | | | | | | | | | |
| Percent Zeolite | 50 | 40 | 30 | 80 | — | 30 | 50 | 30 | 20 | 40 | 40 |
| Percent Gamma Alumina | 50 | 60 | 70 | — | 100 | 70 | 50 | 70 | 80 | 60 | 60 |
| Percent Silica | — | — | — | 20 | — |  |  |  | — | — | — |
| Properties | | | | | | | | | | | |
| Surface Area ($m^2/g$) | 215 | 215 | 205 | 235 | 205 | .74 | 210 | 205 | 220 | 280 | 170–260 |
| Porosity (%) | 31.2 | 33.0 | 39.0 | 35.4 | 67.0 | 40.4 | 35.4 | 35.4 | 26.4 | 31.0 | — |
| Mean Pore Size (Nm) | 40 | 30 | 20 | 470 | 12 | 20 | 40 | 20 | 40 | 80 | — |
| Modulus Of Rupture (psi) | 1109 | 879 | 1397 | 3410 | 1469 | 1398 | 1109 | 1398 | 2063 | 939 | ~1000 |
| Elastic Modulus ($\times 10^{-6}$ psi) |  | 0.55 | 0.53 | 1.90 | 0.82 | 0.53 | 0.57 | 1.41 | 1.26 | 0.59 |  |

TABLE I-continued

|  | 1 | 2 | 3 | 4* | 5* | 6 | 7 | 8 | 9 | 10 | 11 |
|---|---|---|---|---|---|---|---|---|---|---|---|
| Mean Coefficient Of Thermal Expansion ($\times 10^{-7}/°$ C.) | 15.0 | 24.0 | 39.4 | 13.8 | 64.5 | 39.4 | 15.0 | 36.5 | 51.2 | 21.3 | ~25.0 |
| Calculated Thermal Shock Resistance (° C.) | 1290 | 461 | 670 | 1301 | 324 | 670 | 1290 | 272 | 320 | 747 | — |

*Comparison Examples

TABLE II

|  | 1 | 2 | 3 | 4* | 5* | 6 | 7 | 8 | 9 | 10 | 11 |
|---|---|---|---|---|---|---|---|---|---|---|---|
| Light OFF Temperature (° C.) | | | | | | | | | | | |
| CO | 228 | 222 | 205 | 260 | 230 | 205 | 288 | 186 | 185 | 230 | |
| NOx | 228 | 228 | 188 | 250 | 230 | 188 | 288 | 198 | 188 | 230 | |
| HC's | 260 | 247 | 188 | 285 | 240 | 188 | 260 | 223 | 205 | 247 | |

*Comparison Examples

An examination of TABLE I, reveals that the surface areas of all the samples are essentially the same while the porosity of the samples change quite dramatically. Unlike the zeolite/silicone sample, Example 4, it is believed that the binder, boehmite in Examples 1–3, effectively interacts with surface OH groups of the materials. During the drying process, boehmite deforms and extracts to bring the all particles together in the process of dehydration, thereby yielding a small mean pore size.

Examples 1–3 each exhibit a lower thermal expansion than the 100% alumina sample, Example 5. The pure alumina sample exhibits a high enough thermal expansion, such that it would likely not survive in the thermal cycles of a typical automotive exhaust system. It is believed that the presence of negative thermal expansion zeolite component, is responsible for the lowered thermal expansion of the inventive zeolite/alumina when compared to the pure alumina sample An examination of TABLE II, reveals that the 100% alumina sample, Example 5 has a lower catalytic performance than the inventive samples, Examples 1–3, and Examples 6–11. Specifically, it can be seen that for the Example 5 catalyst the light off temperatures are below 200° C. It is believed that presence of very small size pores, limit the catalytic performance, in spite of the high porosity, due to the minimization of the diffusion of the exhaust gas pollutant molecules through the pores.

Referring to Example 4, extruded zeolite with silica binder, TABLE I reveals that this sample has low catalytic activity towards both the oxidations of CO and HC's, as well as the reduction of $NO_x$. Although this sample has a large measured mean pore sizes, the channel size of 5.4×5.6 Å, typically present in zeolite crystals, restricts the diffusion of pollutant molecules to catalyst active sites, thus, resulting in high light-off temperatures.

While not intending to be limited by theory it is surmised that inventive zeolite/alumina composites have increased catalytic performance, when compared to the extruded pure alumina, in part due to the presence of the alumina component. It is thought that the presence of the alumina is at least partly responsible for increasing the catalytic activity over that for typical zeolite based catalysts whose catalytic performance are typically thought to be low. Furthermore, it is believed that the relatively large pore size of the inventive zeolite/alumina composites, when compared to alumina, is an important factor for contributing the low light-off temperature; the inclusion of the zeolite component of the composite contributes to the increase in the average pore size.

It should be understood that while the present invention has been described in detail with respect to certain illustrative and specific embodiments thereof, it should not be considered limited to such, as numerous modifications are possible without departing from the broad spirit and scope of the present invention as defined in the appended claims.

We claim:

1. A zeolite/alumina composite for use as a catalyst substrate or catalyst carrier consisting essentially, in parts by weight, of about 30–70 parts of high-silica zeolite having a silica/alumina ratio of greater than 300:1, and 30–70 parts of gamma alumina or stabilized gamma alumina having a specific surface area of greater than 100 m$^2$/g, and, optionally, up to 30% by weight of stabilized zirconia oxygen storage material, the composite exhibiting a modulus of rupture of at least 750 psi, a specific surface area of greater than 100 m$^2$/g, and being substantially free of silica binder material.

2. A zeolite/alumina composite as claimed in claim 1 wherein the composite exhibits a modulus of rupture of at least 1000 psi.

3. A zeolite/alumina composite as claimed in claim 1 wherein the composite exhibits a surface area of at least 200 m$^2$/g.

4. A zeolite/alumina composite as claimed in claim 1 wherein the composite exhibits a thermal expansion of less than about 5×10$^{-6}$/°C.

5. A zeolite/alumina composite as claimed in claim 1 wherein the composite exhibits thermal stability at a temperature up to at least 1000° C.

6. A zeolite/alumina composite as claimed in claim 1 wherein the zeolite/alumina composite is honeycomb structure exhibiting at least 600 cells/in$^2$.

7. A zeolite/alumina composite as claimed in claim 1 wherein the stabilized zirconia includes a dopant selected from the group consisting of cerium oxide, titanium oxide, yttrium oxide, magnesium oxide, praseodymium oxide, calcium oxide, magnesium oxide, barium oxide, and mixtures thereof.

8. A zeolite/alumina composite as claimed in claim 7 wherein the stabilized zirconia includes a dopant mixture comprising up to about 80%, by weight cerium oxide and up to about 20%, by weight yttrium oxide, based on the total amount zirconia.

9. A zeolite/alumina composite as claimed in claim 1 wherein the alumina includes a stabilizing agent selected from the group consisting of lanthanum oxide, barium oxide, strontium oxide and yttrium oxide.

* * * * *